(12) United States Patent
Bright et al.

(10) Patent No.: US 6,418,323 B1
(45) Date of Patent: Jul. 9, 2002

(54) WIRELESS MOBILE PHONE WITH MORSE CODE AND RELATED CAPABILITIES

(75) Inventors: Walter G. Bright; Eric Engstrom, both of Kirkland, WA (US)

(73) Assignee: Wildseed, Ltd., Kirkland, WA (US)

( * ) Notice: Subject to any disclaimer, the term of this patent is extended or adjusted under 35 U.S.C. 154(b) by 20 days.

(21) Appl. No.: 09/767,587

(22) Filed: Jan. 22, 2001

(51) Int. Cl.[7] .................................................. H04B 1/38
(52) U.S. Cl. ....................... 455/550; 455/557; 455/566; 340/7.6; 340/7.61
(58) Field of Search ................................ 455/418, 557, 455/566, 567, 90, 550; 340/407.1, 407.2, 7.6, 7.61, 815.45

(56) References Cited

U.S. PATENT DOCUMENTS 5,263,195 A * 11/1993 Panther et al. .............. 455/316
5,721,783 A * 2/1998 Anderson ................... 381/68.6

FOREIGN PATENT DOCUMENTS

JP          409248315      *  9/1997  ........... A61F/11/04

* cited by examiner

*Primary Examiner*—Lee Nguyen
(74) *Attorney, Agent, or Firm*—Columbia IP Law Group, PC

(57) ABSTRACT

A wireless mobile phone, is provided with a couple of buttons and complementary logic to facilitate entry and transmission of Morse code representations of alphanumeric data. As a result, a user may use the provided facilities to engage in non-verbal communication for sensitive subject matters in the middle of a call. In one embodiment, the complementary logic further facilitates echoing on a display, alphanumeric data corresponding to any entered Morse code representations. Additionally, each of the Morse code entry buttons includes one or more light emitting diodes (LEDs), and the LEDs are lit to visually echo the Morse code representations of any alphanumeric data entered through a standard input keypad.

11 Claims, 5 Drawing Sheets

300

200 (cont'd)

WIRELESS MOBILE PHONE WITH MORSE CODE AND RELATED CAPABILITIES

BACKGROUND OF THE INVENTION

1. Field of the Invention

The present invention relates to the field of wireless mobile phones. More specifically, the present invention relates to complementary features that enhance the usability of wireless mobile phones.

2. Background Information

Advances in integrated circuit and telecommunication technology have led to wide spread adoption of wireless mobile client devices, in particular, wireless mobile telephones. Wireless mobile phones offer the advantage of enabling their users to be communicatively reachable by their business associates, friends and family members, wherever the users may be, as long as they are within the reach of the service networks. Thus, even non-professionals are increasingly dependent on their wireless mobile phones to meet their communication needs.

With increased usage and reliance, often times, wireless mobile phone users would find themselves in the dilemma of having to engage in potentially sensitive conversations in a setting that is less than desirable, privacy-wise. For examples, a user may find himself/herself having to engage in an urgent personal or business conversation at a bus stop while waiting for the next bus, or at an airport terminal while waiting to board his/her flight. Under the prior art, a user may have to elect to continue the private/sensitive conversation in a less than private manner, switch to another form of communication, such as email, or delay the communication. Each of these options has disadvantages. Electing to proceed with the conversation in a less than private manner may unduly expose private/sensitive information to the public. Switching communication form is inconvenient. That is true even if the user is in possession of a wireless mobile phone capable of sending add receiving emails. The reason being, any switching would likely at a minimum, disrupt the continuity of the communication.

Therefore, a more user-friendly approach to accommodating privacy sensitive communication is desired.

Note: The term "wireless mobile phone" as used in herein (in the specification and in the claims) refers to the class of telephone devices equipped to enable a user to make and receive calls wirelessly, notwithstanding the user's movement, as long as the user is within the communication reach of a service or base station. The term "wireless mobile phone" is to include the analog subclass as well as the digital subclass (of all signaling protocols).

SUMMARY OF THE INVENTION

A wireless mobile phone, is provided with at least two extra buttons (in addition to the standard input keypad) and complementary logic to facilitate entry of alphanumeric data via entry of their Morse code representations, and transmission of the entered alphanumeric data. As a result, a user may more naturally use the provided facilities to engage in non-verbal communication for sensitive subject matters in the middle of a call.

In one embodiment, the complementary logic further facilitates echoing on a local display, alphanumeric data corresponding to the entered Morse code representations. Additionally, each of the Morse code entry buttons includes one or more light emitting diodes (LEDs), and the LEDs are lit to visually echo the Morse code representations of any alphanumeric data entered through the standard input keypad.

Further, in one embodiment, the wireless mobile phone includes an adapter interface designed to be able to have a device capable of vibrating removably attached to the wireless mobile phone to facilitate the complementary logic to vibrationally output a text message received, through vibrational manifestation of the text message's Morse code representations.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. The phrase "in one embodiment" will be used repeatedly, however the phrase does not necessarily refer to the same embodiment, although it may.

Figure 1A:
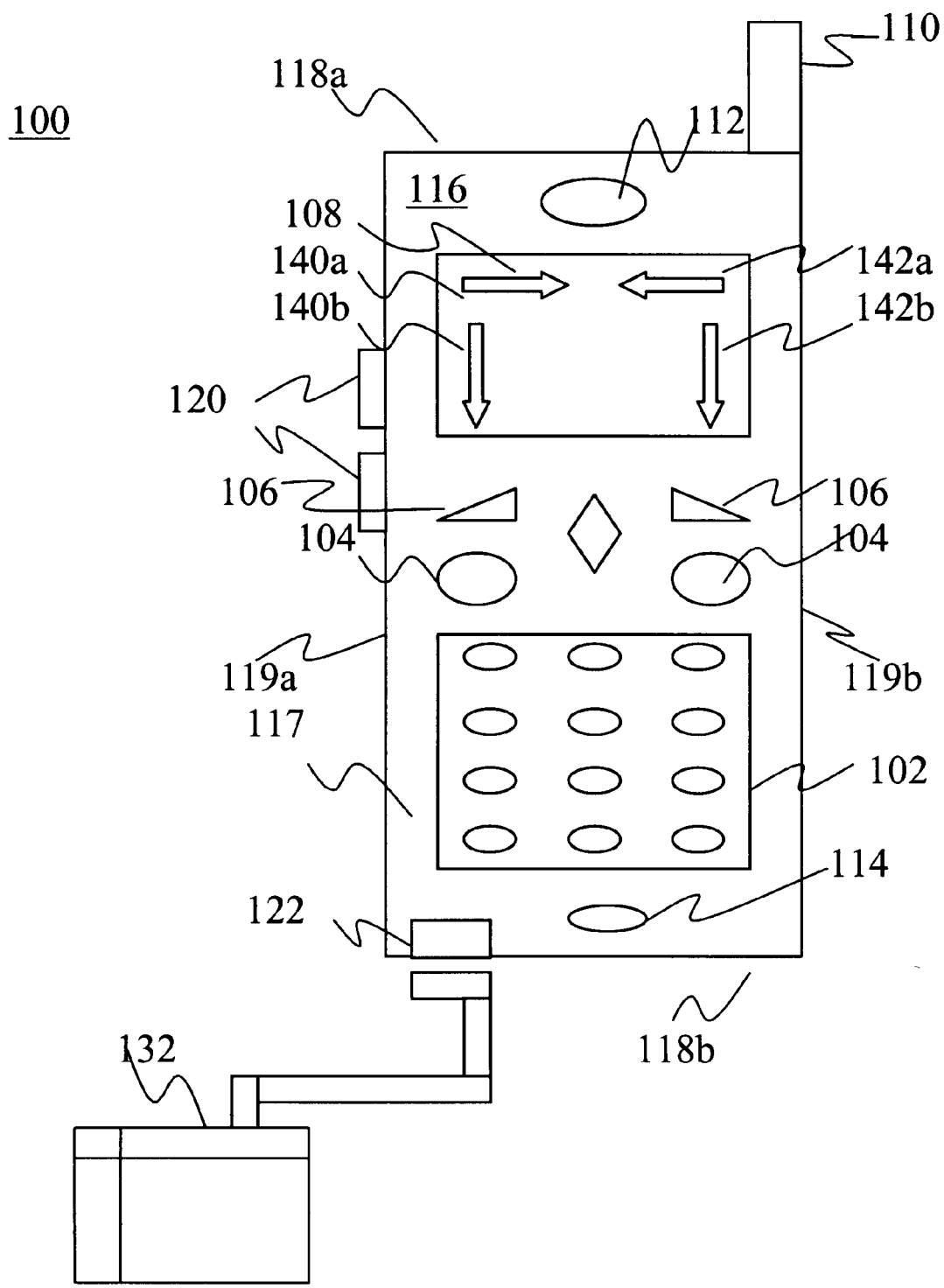
FIGS. 1a–1b illustrate a wireless mobile phone of the present invention, incorporated with the Morse code facilities in accordance with the present invention, in accordance with two embodiments.
Figure 1B:
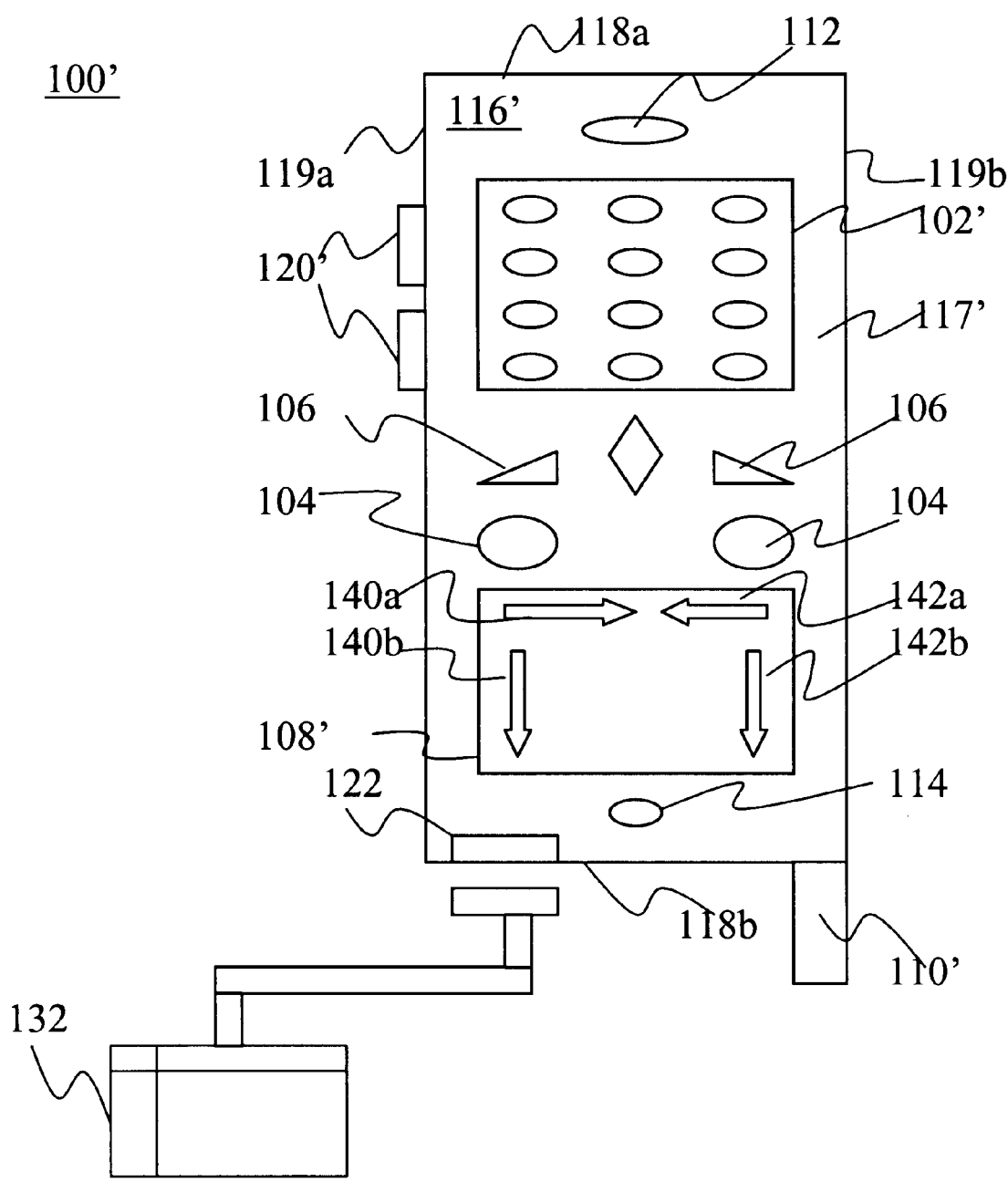

Referring now to FIGS. 1a–1b, wherein two embodiments of a wireless mobile phone 100 and 100', incorporated with the teachings of the present invention are shown. As illustrated, in accordance with the present invention, wireless mobile phone 100/100' is provided with two extra buttons 120 and complementary logic (shown as ref. 330 in FIG. 3) to facilitate a user of phone 100/100' to enter and send alphanumeric data, e.g. a text message. More specifically, buttons 120 in conjunction with the complementary logic facilitate a user in entering alphanumeric data through entry of their Morse code representations (see Tables I–III), and causing the entered alphanumeric data to be sent. One of buttons 120 is provided to allow a user to enter the "dit" representation, while the other is provided to allow the user to enter the "dah" representation. The facilities may be employed in particular during a call, thereby enabling the user to conduct all or a portion of a call in a non-audible and more private manner.

TABLE I

Morse Codes for Letters

| Letters | Morse Code |
| --- | --- |
| A | ditdah |
| B | dahditditdit |
| C | dahditdahdit |
| D | dahditdit |
| E | dit |
| F | ditditdahdit |
| G | dahdahdit |
| H | ditditditdit |
| I | ditdit |
| J | ditdahdahdah |
| K | dahditdah |
| L | ditdahditdit |
| M | dahdah |
| N | dahdit |
| O | dahdahdah |
| P | ditdahdahdit |
| Q | dahdahditdah |
| R | ditdahdit |
| S | ditditdit |
| T | dah |
| U | ditditdah |
| V | ditditditdah |
| W | ditdahdah |
| X | dahditditdah |
| Y | dahditdahdah |
| Z | dahdahditdit |

TABLE II

Morse Code for Numbers

| Numbers | Morse Code |
| --- | --- |
| 0 | dahdahdahdahdah |
| 1 | ditdahdahdahdah |
| 2 | ditditdahdahdah |
| 3 | ditditditdahdah |
| 4 | ditditditditdah |
| 5 | ditditditditdit |
| 6 | dahditditditdit |
| 7 | dahdahditditdit |
| 8 | dahdahdahditdit |
| 9 | dahdahdahdahdit |

TABLE III

Morse Codes for Punctuations

| Punctuations | Morse Codes |
| --- | --- |
| / (slash) | dahditditdahdit |
| , (comma) | dahdahditditdahdah |
| . (period) | ditdahditdahditdah |
| ? (question mark) | ditditdahdahditdit |

In one embodiment, the conventional operational setting selection feature of phone 100/100' is enhanced to facilitate a user in selecting an operational rate for processing and interpreting Morse codes, e.g. 5 wpm, 13 wpm, 20 wpm and so forth. The different operational rates facilitate usage by users of varying skill levels, from the novice users to the more advanced users.

Preferably, buttons 120 are strategically placed on a side surface of phone 100/100' to facilitate single-handed operation of phone 100/100'. That is, with the side surface placement of buttons 120, a user may e.g. use two fingers of the same hand holding phone 100/100' to manipulate buttons 120 to enter alphanumeric data of a text message to be transmitted by entering their Morse codes. Thus a user may be holding phone 100/100', engage in a verbal conversation, and switch to sending the other calling party a non-verbal text message, and then switch back to verbal conversation, all performed without changing the position of phone 100/100' or altering the manner phone 1001100' is held. Phone 100/100' may be held next to the user's ear or in any arbitrary position if an earpiece or a speaker is used.

For the illustrated embodiments, which are designed for right-handed users, buttons 120 are strategically placed on left side surface 119a of body casing 116 of phone 100/100'. In alternate embodiments, designed for left-handed users, buttons 120 may be strategically placed on right side surface 119b of body casing 116 of phone 100/100' instead. In yet other alternate embodiments, buttons 120 may be placed on the top surface at top end 118a.

Beside side surfaces 119a and 119b, and top end 118a, body casing 116 also has bottom end 118b as well as front surface 117/117'. Note that side surfaces 119a and 119b, top and bottom ends 118a and 118b, and front surface 117/117' are all objectively determined. As illustrated, wireless mobile phone 100/100' also includes display 108/108'. Such a device necessarily has a reading orientation. By definition, the surface upon which the display is disposed is the front surface. The front surface in turn definitively defines the left side surface and the right side surface. Further, such a device necessarily has a display orientation, which definitively defines top and bottom ends 118a and 118b. For example, textual data are either rendered from left to right and top to bottom, as denoted by arrows 140a and 140b, as in the case of the English language, or right to left and top to bottom, as denoted by arrows 142a and 142b as in the case of the Hebrew language, or top to bottom and right to left, as denoted by arrows 142b and 142a, as in the case of the Chinese language. Thus the manner in which textual data are rendered definitively defines which end is the top end, and which end is the bottom end. Moreover, an element A of phone 100/100' will necessarily be considered as above element B of phone 100/100', and element B will necessarily be considered as below or beneath element A, if element A is doser to the objectively determinable top end of phone 100/100' (or element B is closer to the objectively determinable bottom end of phone 100/100').

Continuing to refer to FIGS. 1a–1b, beside buttons 120 and the complementary logic, phone 100/100' is otherwise intended to represent a broad range of wireless mobile phones, including both the analog as well as the digital types (of all signaling protocols). In addition to buttons 120, the complementary logic, body casing 116/116' and display 108/108' phone 100/100' further includes standard input key pad 102/102' having a number of conventional alphanumeric keys, "talk" and "end talk" buttons 104, cursor control buttons 106, antenna 110/110', ear speaker 112, microphone 114 and adapter interface 122.

The two embodiments differ in the relative disposition of antenna 110/110' to ear speaker 112, and the relative disposition of keypad 102/102' to display 108/108'. In the first embodiment, similar to conventional prior art wireless mobile phones, antenna 110 and ear speaker 112 are both disposed near top end 118a, whereas in the second embodiment, unlike conventional prior art wireless mobile phones, antenna 110' is disposed near bottom end 118b while ear speaker 112 is disposed near top end 118a. Further, in the first embodiment, similar to conventional prior art wireless mobile phones, keypad 102 Is disposed In the lower half of phone 100 beneath display 108, whereas in the second embodiment, unlike conventional prior art wireless mobile phones, keypad 102' is disposed in the upper half of phone 100' above display 108'. In other words, except for Morse code buttons 120 and the associated complementary logic of the present invention, the first embodiment represents a wide range of wireless mobile phones known in the art. Similarly, except for Morse code buttons 120 and the associated complementary logic of the present invention, the second embodiment is disclosed in co pending application Ser. No. 09/767,526, contemporaneously filed, entitled "A Wireless Mobile Phone with Inverted Placement of Antenna and Keypad", which is hereby fully incorporated by reference.

Further, for the illustrated embodiments, each of buttons 120 includes light emitting diodes (LED). The LEDs are employed by the complementary logic to visually echo the Morse code representations of alphanumeric data entered through input keypad 102/102', thereby facilitating a user in learning Morse code. In various embodiments, the present invention also contemplates the conventional operational setting feature of phone 100/100' will further be enhanced to facilitate enabling/disabling of this "learn mode".

Additionally, as alluded to earlier, phone 100/100' includes adapter interface 122 for removably attaching a variety of accessory devices to phone 100/100'. Among these removably attachable accessory devices include e.g. ear piece (not shown), and vibration device 132. Thus, with the attachment of vibration device 132, the complementary logic may vibrationally output received alphanumeric data through vibrational manifestations of their corresponding Morse code representations. As a result, a user may silently and vibrationally receive a text message.

Figure 2A:
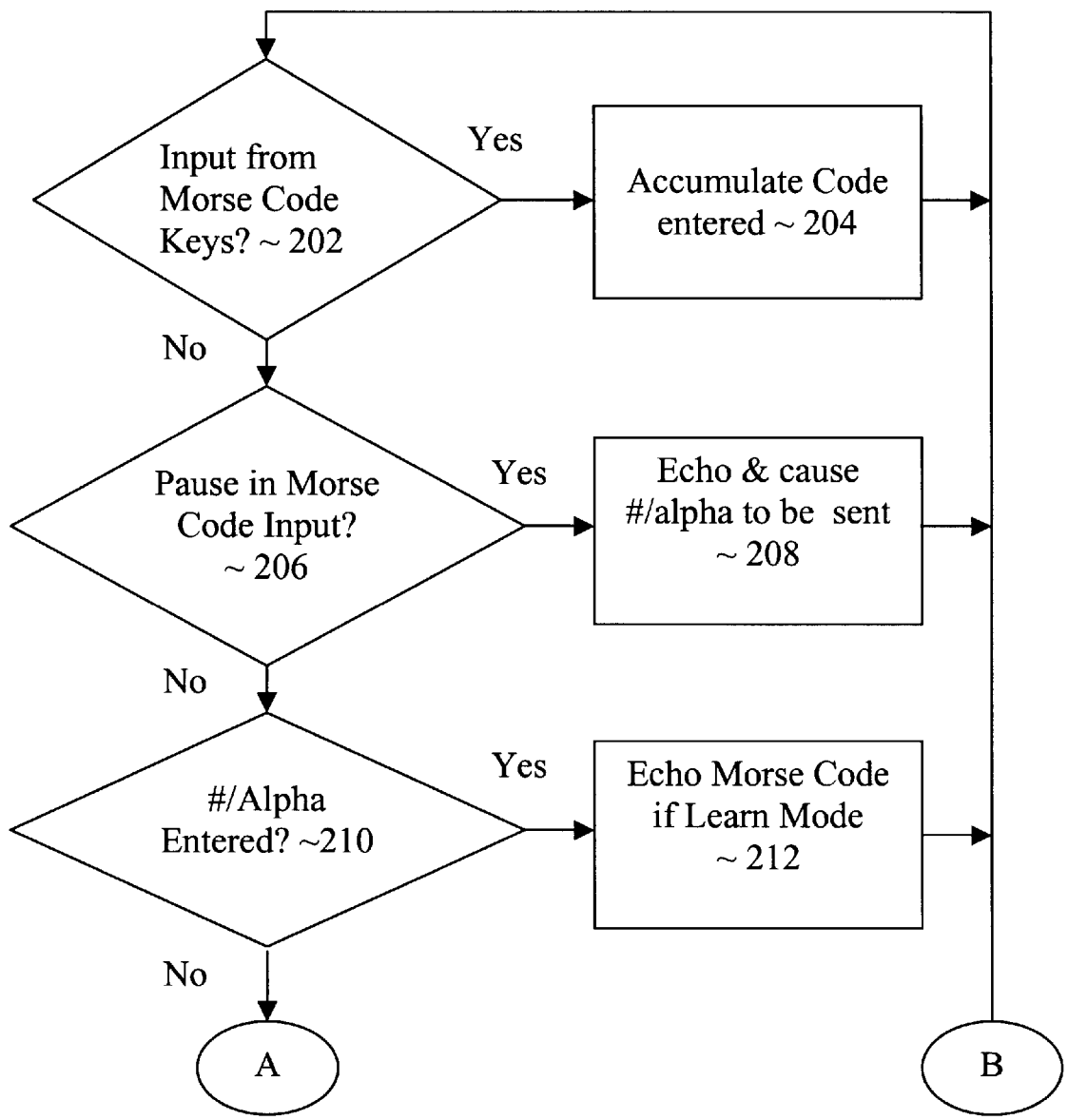
FIGS. 2a–2b illustrate the operational flow of the relevant aspects of the Morse code logic provided to the wireless mobile phone of FIGS. 1a/1b, in accordance with one embodiment.
Figure 2B:
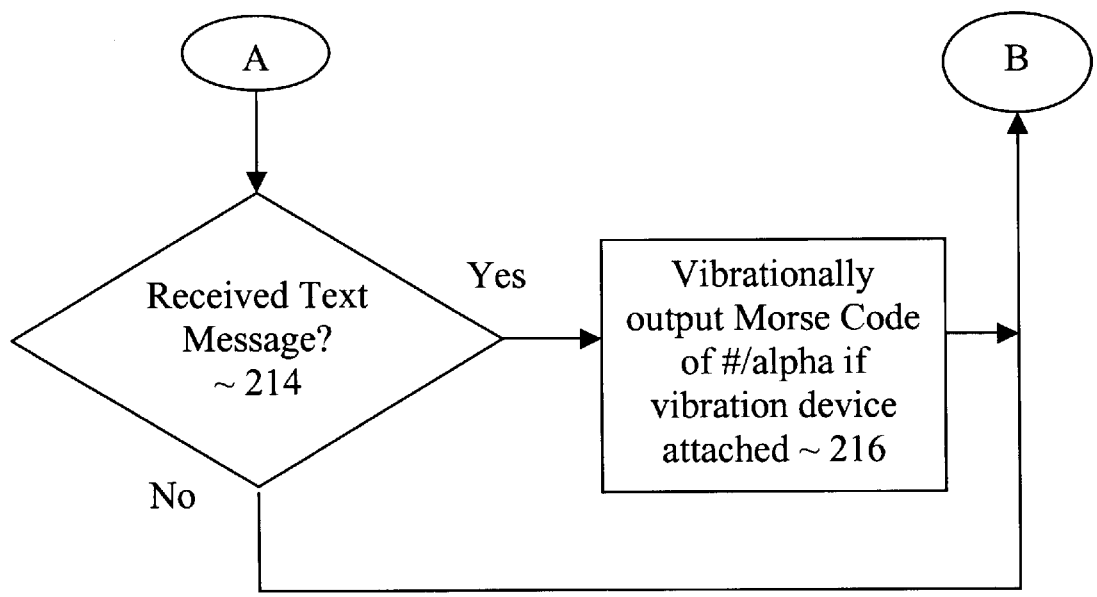

Referring now to FIGS. 2a–2b, wherein the operational flow (200) of the relevant aspects of the complementary logic is shown. As illustrated, during operation, the complementary logic continuously checks and determines the operational state of phone 100/100', and acts accordingly. For the illustrated embodiment, the complementary logic first checks to determine if an input has been entered using one of the Morse code buttons 120, block 202. If an input has been entered, the complementary logic accumulates the Morse code input received (until a letter, a number or a punctuation has been inputted), using e.g. an accumulation buffer, block 204.

Back at block 202, if it is determined that a Morse code has not been just inputted, the complementary logic determines if the operational state is considered to be at a pause after a series of successive Morse code inputs have been entered, block 206. If it is determined that the operational state is at such a pause, the complementary logic causes the corresponding alphanumeric data to be injected into the data stream to be transmitted, resulting in their eventual transmission, block 208. The complementary logic also causes the corresponding alphanumeric data to be visually echoed on display 108/108' (based on the accumulated Morse code since the last "refresh" of the accumulation buffer), block 208. Upon echoing, the complementary logic also "clears" the accumulated Morse code inputs.

On the other hand if back at block 206, it was determined that the operational state is not at such a pause, the complementary logic further determines if alphanumeric data has just been entered through input keypad 102/102', block 210. If it is so determined, and assuming the earlier described "learn mode" is enabled, the complementary logic causes the LEDs of buttons 120 to be lit up accordingly (with a pattern of "dit" and "dah") to visually echo the corresponding Morse codes of the entered alphanumeric data, block 212.

Back at block 210, if it was determined that alphanumeric data has not been just entered through input keypad 102/102', the complementary logic further determines if alphanumeric data has just been received from another device, e.g. another phone, block 214. The complementary logic makes the determination by analyzing the received data stream. If so and a vibration device is attached to phone 100/100', the complementary logic vibrationally output the received alphanumeric data by causing the vibration device to vibrationally manifest the corresponding Morse code representation of the received alphanumeric data, block 216.

In each case, upon accumulating an entered Morse code (block 204), echoing the corresponding alphanumeric data of the entered Morse code (block 208), echoing the Morse code of entered alphanumeric data (block 212), or vibrationally outputting the Morse code representation of received alphanumeric data (block 214), the complementary logic continues operation back at block 202.

Thus, it can be seen from the above description, a user of phone 100/100' may advantageously use the facilities provided to enter and send a text message, by entering their Morse codes, during a call, thereby enabling the user to be able to selectively communicate with the caller/callee in a non-verbal or more private manner.

Figure 3:
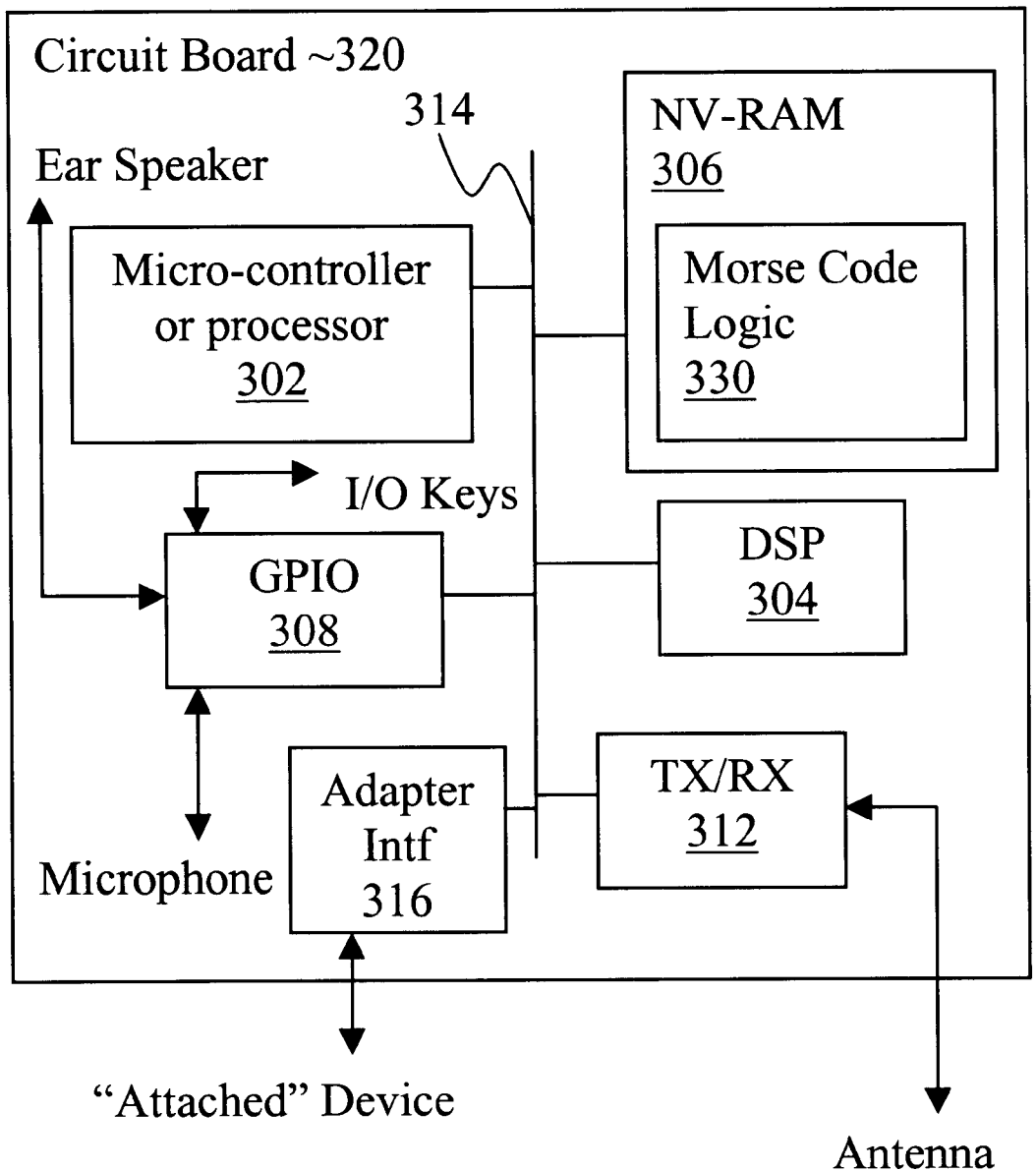
FIG. 3 illustrates an internal component view of the wireless mobile phone of FIG. 1a/1b, in accordance with one embodiment.

FIG. 3 illustrates an architecture view of a wireless mobile phone 300, in accordance with one embodiment. As illustrated, wireless mobile phone 300 includes elements found in conventional mobile client devices, such as microcontroller/processor 302, digital signal processor (DSP) 304, non-volatile memory 306, general purpose input/output (GPIO) interface 308, transmit/receive (TX/RX) 312 (also known as transceiver), and adapter interface 316, coupled to each other via bus 314 and disposed on a circuit board 320. Except for the use of GPIO 308 to also interface Morse code buttons 120, and the use of non-volatile memory 306 to host complementary logic 330, the elements are used to perform their conventional functions known in the art. In particular, TX/RX 312 may support one or more of any of the known signaling protocols, including but are not limited to CDMA, TDMA, GSM, and so forth. Their constitutions are known. Accordingly, the elements will not be further described.

Thus, a wireless mobile phone enhanced to enable its user to more naturally communicate a message non-audibly during a call has been described. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A wireless mobile phone comprising:

a transceiver to send and receive signals;

a body casing having a front surface and a side surface;

an input keypad disposed on said front surface of said body casing to facilitate entry of alphanumeric data;

a first button disposed on said side surface of said body casing;

a second button disposed on said side surface of said body casing adjacent to said first button; and means coupled to the first and second buttons and to the transceiver to facilitate entry of alphanumeric data in Morse code representations using said first and second buttons, and transmission of said alphanumeric data using said transceiver, wherein each of said first and second buttons includes one or more light emitting diodes (LED), and said means further lights said LEDs of said first and second buttons to visually echo Morse code representations of alphanumeric data entered through said input keypad.

2. The wireless mobile phone of claim 1, wherein said mobile phone further comprises a display, and said means further echoes on said display alphanumeric data represented by Morse codes entered using said first and second buttons.

3. The wireless mobile phone of claim 1, wherein said mobile phone further comprises an adapter interface to removably attach a device capable of vibrating to said mobile phone, and to vibrationally output alphanumeric data received through said transceiver using said removably attached device capable of vibrating.

4. The wireless mobile phone of claim 3, wherein said alphanumeric data are vibrationally outputted through vibrational manifestation of the Morse code representations of the alphanumeric data.

5. A wireless mobile phone comprising:
   a body casing having a front surface and a side surface;
   an input keypad disposed on said front face of said front surface to facilitate entry of alphanumeric data;
   a first button disposed on said side surface of said body casing, having first one or more light emitting diodes (LEDs);
   a second button disposed on said side surface of said body casing, adjacent to said first button, and having second one or more LEDs; and
   means coupled to the input keypad and the first and second buttons to light said LEDs of said first and second buttons to visually echo Morse code representations of alphanumeric data entered through said input keypad.

6. A wireless mobile phone comprising:
   a transceiver to send and receive signals;
   a body casing having a top surface and a side surface;
   a first button disposed on either said top surface or said side surface of said body casing;
   a second button disposed on the same top/side surface of said body casing adjacent to said first button; and
   means coupled to the first and second buttons and to the transceiver to facilitate entry of alphanumeric data in Morse code representations using said first and second buttons, and transmission of said alphanumeric data using said transceiver, wherein each of said first and second buttons includes one or more light emitting diodes (LED), and said means further lights said LEDs of said first and second buttons to visually echo Morse code representations of alphanumeric data entered through said input keypad.

7. A wireless mobile phone comprising:
   a transceiver to send and receive signals;
   a body casing having a top surface and a side surface;
   a first button disposed on either said top surface or said side surface of said body casing;
   a second button disposed on the same top/side surface of said body casing adjacent to said first button; and
   a micro-controller and associated memory, including programming instructions stored in said memory, coupled to the first and second buttons and to the transceiver to facilitate entry of alphanumeric data in Morse code representations using said first and second buttons, and transmission of said alphanumeric data using said transceiver, wherein each of said first and second buttons includes one or more light emitting diodes (LED), and said micro-controller further lights said LEDs of said first and second buttons to visually echo Morse code representations of alphanumeric data entered through said input keypad.

8. In a wireless mobile phone, a method comprising:
   receiving Morse code representations of alphanumeric data entered using a first and a second button disposed on a top or side surface of the mobile phone, said mobile phone also having an input keypad disposed on a front surface to facilitate entry of alphanumeric data; and
   in response, electrically generating signals corresponding to digital representations of said alphanumeric data entered through entry of their Morse code representations using said first and second buttons, and transmitting said alphanumeric data by electromagnetically transmitting said generated signals, wherein each of said first and second buttons includes one or more light emitting diodes (LED), and said method further comprises lighting said LEDs of said first and second buttons to visually echo Morse code representations of alphanumeric data entered through said input keypad.

9. The method of claim 8, wherein said method further comprises visually echoing on a display of said mobile phone said alphanumeric data entered through entry of their Morse code representations using said first and second buttons.

10. The method of claim 8, wherein said mobile phone further comprises an adapter interface to removably attach a device capable of vibrating to said mobile phone, and said method further comprises vibrationally outputting alphanumeric data received through a transceiver of said mobile phone using said removably attached device capable of vibrating.

11. The method of claim 10, wherein said alphanumeric data are vibrationally outputted through vibrational manifestation of the Morse code representation of the alphanumeric data.

* * * * *